United States Patent Office 3,326,974
Patented June 20, 1967

3,326,974
POLYAMIDES AND PROCESS THEREFOR
Norman Rainer, Massapequa Park, N.Y., assignor to
Seekay Chemical Company, Brooklyn, N.Y.
No Drawing. Filed June 25, 1964, Ser. No. 378,039
5 Claims. (Cl. 260—557)

This application is a continuation-in-part of application Ser. No. 205,120, filed June 25, 1962, now abandoned.

This invention relates to tris (acetamido) amines and more particularly to novel crystallizable tris (acetamido) amines having mono substituted amide groups, and process therefor.

The compounds of this invention may be represented by the formula

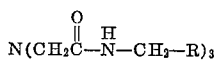

wherein R is a hydrogen atom or a hydrocarbon group containing from 1 to 10 carbon atoms, including alkyl, aryl, and cycloalkyl. Typical R representations are hydrogen, ethyl, allyl, butyl, octyl, decyl, cyclopentyl, cyclohexyl, butylcyclohexyl, phenyl, tolyl, xylyl, benzyl, phenylethyl, phenylbutyl, and various isomers and analogs thereof. The three R groups in any given compound may be the same or different.

The compounds of the present invention may be made by reacting nitrilotriacetonitrile with water and a primary hydrocarbon amine of the formula

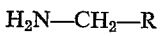

wherein R is as defined hereinabove. The reaction may be carried out at temperatures of 40–150° C. During the course of the reaction ammonia is evolved and is preferably continuously removed. The reaction is generally completed in 2 to 20 hours, depending upon the temperature employed, the nature of the amine, and the type of agitation utilized, if any. The end of the reaction may generally be ascertained by observing the cessation of ammonia generation. The reaction product thus obtained is generally discolored by the presence of chromophoric impurities. It has been found however that these impurities can be removed by drying the reaction product to a water content below about 3%, and then contacting the dried product with a water miscible organic fluid. The water miscible fluid is preferably a fairly volatile material having a boiling point below the melting point of the tris acetamido amine. Especially preferred fluids for use with water soluble tris acetamido amines are those having no active hydrogen, representative species including: acetone, acetaldehyde, methyl formate, acetonitrile, and tetrahydrofuran. Contact of the dried reaction product with the water miscible organic fluid may be effected in either a washing or re-crystallization operation. In the substantial absence of water, the preferred water miscible fluids defined above are found to dissolve the chromophoric impurities while having considerably less solvent action on the tris acetamido amine.

The expression "active hydrogen" as employed herein denotes active hydrogen atoms as defined by the Zerewitinoff test as described by Kohler in J. Am. Chem. Soc., 49, 3181 (1927).

In order to increase the compatibility of the reactants and thereby facilitate the reaction, inert solvents may be employed. Such solvents include dimethylformamide, dimethylacetamide, dimethylsulfoxide, tetrahydrofurfuryl alcohol, cyclohexanol, butyrolactone, monoethyl glycol ether, monomethyl glycol ether, N-methylpyrrollidone, dioxane, and other solvents having a propensity to dissolve nitrilotriacetonitrile in the presence of amines and water. In general, one mole of nitrilotriacetonitrile reacts with 3 moles of water and 3 moles of the amine to form the tris (acetamido) amines of this invention. Excesses of either ingredient may however be employed in order to facilitate processing in the course of the reaction or in subsequent purification operations. Yields as high as 85% of purified trisamide product may be obtained by the above-described procedure.

The compounds of the present invention may also be made by the pyrolysis at temperatures above 160° C. of suitable amine salts of nitrilotriacetic acid. This method is particularly suitable when employed with high boiling amines. With amines boiling below about 160° C., stepwise salt formation and pyrolysis may be required to convert each of the three carboxylic acid moieties in the nitrilotriacetic acid to the appropriate amide.

I have found that, in order to secure crystalline, white tris (acetamido) amines as in the present invention, a critical balance of hydrogen bonding characteristics must be achieved in the molecule. For example, it has been found that the analogous secondary amides, i.e., having six instead of three R groups per molecule, and having no amidic hydrogen, are not crystallizable and cannot be readily obtained in substantially pure form. Thus, the secondary amide tris (N,N dimethylacetamido) amine which may be produced by the above-described methods, is obtained as a dark red tar which is not amenable to standard methods of purification. By way of contrast, the analogous primary amide tris (N methylacetamido) amine, within the purview of this invention, is readily obtained by crystallization from ordinary solvents as a pure white crystalline solid. It has also been found that any sites of hydrogen bonding in the group R such as nitrogen and oxygen atoms, particularly when associated with an active hydrogen atom, cause the amide to exist in non-purifiable forms. For example, when R is —OH, —CH₂—OH, or —CH₂—O—CH₂CH₂OH, the tris amide materials obtained are hygroscopic dark glassy solids or tars, and cannot be purified. The methylene group in the compounds of this invention intervening between the amidic nitrogen and the group R is found necessary in securing crystalline properties. For example, by way of contrast, the unsubstituted amide having no methylene substituent, tris (acetamido) amine, is a delequescent paste. The compounds tris (N-phenyl acetamido) amine and tris (N-t-butyl acetamido) amine, also having no methylene substituents, have likewise been found difficult to prepare in pure form.

The melting points of polar crystalline compounds are frequently indicative of the magnitude of intermolecular forces of attraction. Amongst compounds of the present invention it is generally found that the crystalline melting point exceeds 128° C., the melting point of the nitrilotriacetonitrile from which said compounds may be derived. At melting points below 128° C. the forces of intermolecular attraction are at levels which make crystallization and removal of impurities difficult. The present compounds may have melting points as high as 180° C.

The compounds of this invention may be employed for conversion into tris N-methylol compounds by known methods. References: Chwala, Monatsh 78, 172–3 (1948); Sachs, Berichte 31, 1231 (1898); Tawney U.S. Patent No. 2,526,517. The tris N-methylol compounds are useful for the treatment of cotton and rayon fabrics to effect a cross linking which leads to wrinkle resistance of the fabric. The cross linking may be effected in standard manner by heating the fabric impregnated with .5% to 3% of this tris (N-methylol acetamido) amine and a small amount of a catalyst such as zinc nitrate, ammonium chloride, diammonium phosphate, triethyl amine hydrochloride, triethanolamine phosphate, or other catalysts including those generally found effective in similar treatments of fabrics with other N-methylol amide compounds to effect crease proofing.

The compounds of this invention are also useful in general as additives for thermoplastic polymers, whereby improvements in polymer rigidity, dimensional stability, and hardness may be secured. When used in this capacity, from about 1% to 7% of the tris amide is found effective when incorporated into the polymer in the melt or solution prior to shaping. In general, tris amide species with large R groups are utilized with less polar polymers such as polyolefins, rubber, and polyterpenes; and tris amide species having small R groups are employed in polar compounds such as polyvinyl alcohol, polyvinyl butyral, polyesters, and polyamides. Although the tris amides of this invention function as property-modifying additives generally due to the physicochemical aspects of their special molecular geometry, in the case of polyamides at elevated temperatures it is quite likely that the tris amides of this invention effect a chemical cross linking of the polymer via amide interchange.

The tris amides of this invention can be reacted with ethylene oxide in the presence of a basic catalyst to form tris N-polyethoxylated derivatives. These derivatives are useful in the production of polyester materials which may be reacted with toluene diisocyanate or bis (p,p′ isocyanatophenyl) methane by known methods to produce useful rigid foam structures.

The amides of the invention can be reacted with chlorine to form tris N-chloro amide derivatives useful in bleaching and disinfecting applications.

The compounds of this invention, as well as the methods for their production, may be more fully understood from the following examples which are offered by way of illustration and not by way of limitation. Parts are by weight unless otherwise specified.

*Example 1*

Five parts nitrilotriacetonitrile, 15 parts benzyl amine, and 5 parts water are placed in a reaction vessel equipped with reflux condenser, agitator, thermometer, and external heating means. The mixed ingredients are heated with agitation to 80° C., at which point the mixture becomes homogeneous, and ammonia begins to evolve. The mixture is then refluxed at 110° C. for 7 hours with continuous agitation, during which period the liquid mixture turns black and ammonia liberation is initially copious and then terminates. Upon cooling, a black solid is obtained. This is dried to about 2.8% water content and is then dissolved in the minimum quantity of hot acetone. Upon cooling of the acetone solution, large white crystals of tris(N-benzylacetamido) amine are obtained in 76% yield. The product, after further recrystallization from methanol, has a melting point of 145° C.

*Example 2*

One hundred and fifty parts of nitrilotriacetonitrile and 500 parts of an aqueous solution containing 40% monomethyl amine, are placed in a reaction vessel equipped with reflux condenser, addition funnel, agitator, thermometer, and external heating means. The mixture is heated at 65° C. with continuous agitation for 3 hours. Sixty additional grams of the 40% monomethyl amine solution are added dropwise over a one hour period while the mixture is maintained at 70° C. with agitation. Heating is maintained for another 2 hours. The mixture is then subjected to evaporative drying at 100° C. in shallow layers. Upon drying to a water content of about 7%, a tar-like residue is obtained which resists further evaporative drying. The tar-like residue is then subjected to drying by azeotropic distillation with toluene. Upon reaching a water content of about 1.3%, the mixture, at 130° C. and in the presence of the toluene, exists as a dark fluid. The dark fluid is poured into 4 times its volume of cold, dry acetone. A tan precipitate forms. The precipitate is filtered, recrystallized from chloroform, washed with acetone, and dried. The product, tris (N-methylacetamido) amine is obtained in 78% yield as a white solid having a melting point of 152° C.

For purposes of comparison, the tar-like residue containing 7% water is treated with acetone in an effort to remove the chromophoric impurities. The acetone is found completely ineffective. The impurities appear to have a far greater affinity for the tris amide and water mixture of the residue than for the acetone.

*Example 3*

The procedure of Example 1 is repeated using 5 parts nitrilotriacetonitrile, 5 parts water, and 22 parts cyclohexylmethyl amine. After crystallization from acetonitrile and recrystallization from methanol, the product, tris (N-cyclohexylmethylacetamido) amine, is obtained in 67% yield as a white crystalline solid.

By way of contrast, attempts to obtain a white solid from the initially discolored reaction product by recrystallization from non-polar hydrocarbon solvents of low dielectric constant are unsuccessful in yielding a white crystalline product.

*Example 4*

Ten parts nitrilotriacetonitrile, 10 parts water, 36 parts decylamine, and 32 parts tetrahydrofurfuryl alcohol are placed in a vessel equipped with reflux condenser, agitator, thermometer, and external heating means. The mixture is refluxed for 10 hours, during which period evolution of ammonia is initially rapid and then subsides. The hot mixture is poured into a large excess of cold water. A tan waxy precipitate of the reaction product is thus obtained. The tan wax is recrystallized from boiling xylene. The crystalline material thus obtained is washed with acetone and dried. The product, tris (N-decylacetamido) amine, is obtained as a white powdery solid in 66% yield. It has a melting point of 137° C.

As many apparently widely different embodiments of this invention may be made without departing from the spirit and scope thereof, it is to be understood this invention is not limited to the specific embodiments thereof except as defined in the appended claims.

What is claimed is:

1. A process for the production of a tris N-substituted acetamido amine represented by the formula:

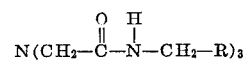

wherein R is a member selected from the group consisting of hydrogen and a hydrocarbon radical of no more than 10 carbon atoms comprising reacting one mole of nitrilotriacetonitrile with water and three moles of a primary hydrocarbon amine of the formula $H_2N-CH_2-R$ wherein R is a member selected from the group consisting of hydrogen and a hydrocarbon radical of no more than 10 carbon atoms, at a temperature in the range of 40–150° C., said reaction liberating ammonia and resulting in a reaction product, drying said reaction product to a water content below 3%, forming a mixture of said dried reaction product with a water miscible organic fluid having a boiling point below the melting point of said tris N-substituted acetamido amine, and separating solidified tris N-substituted acetamido amine from said mixture.

2. A process for the production of tris(N-methylacetamido)amine comprising reacting one mole of nitrilotriacetonitrile with water and three moles of monomethylamine at a temperature in the range of 40–150° C., said reaction liberating ammonia and resulting in a reaction product, drying said reaction product to a water content below 3%, forming a mixture of said dried reaction product with an organic fluid having no active hydrogen and separating solidified tris(N-methylacetamido)amine from said mixture.

3. The process of claim 2 wherein said organic fluid is acetone.

4. Tris (N-cyclohexylmethylacetamido) amine.

5. Tris (N-decylacetamido) amine.

References Cited

UNITED STATES PATENTS

| | | | |
|---|---|---|---|
| 2,245,129 | 6/1941 | Greenewalt | 260—561 |
| 2,765,337 | 10/1956 | De Benneville et al. | 260—561 |
| 3,190,916 | 6/1965 | Rainer | 260—559 |

FOREIGN PATENTS 790,796  2/1958  Great Britain.

OTHER REFERENCES

Braun et al.: Berichte, vol. 60, pages 351–52 relied on (1927).

De Benneville et al.: Jour. Org. Chem., vol. 21, pages 1072–76 (1956).

Exner et al.: Jour. American Chem. Soc., vol. 77, pages 1103–1105 (1955).

Hermann et al.: German application 1,104,695 (K1 39b 22 10), 3 pp. spec.

Weissberger: Technique of Organic Chemistery, vol. 3, Part I, Separation and Purification, pages 301–302 and 555, New York, Interscience, 1956.

WALTER A. MODANCE, *Primary Examiner.*

NATALIE TROUSOF, *Assistant Examiner.*